United States Patent [19]

Hugl et al.

[11] 4,179,436
[45] Dec. 18, 1979

[54] MONOAZODYESTUFFS CONTAINING DIPHENAMINE AND PHENOXY COMPONENTS

[75] Inventors: Herbert Hugl; Karl H. Schündehütte, both of Leverkusen; Kersten Trautner, Cologne; Gerhard Wolfrum, Leverkusen, all of Fed. Rep. of Germany

[73] Assignee: Bayer Aktiengesellschaft, Leverkusen, Fed. Rep. of Germany

[21] Appl. No.: 813,312

[22] Filed: Jul. 6, 1977

[30] Foreign Application Priority Data

Jul. 9, 1976 [DE] Fed. Rep. of Germany ....... 2630989

[51] Int. Cl.² .................. C09B 29/12; C09B 43/00; D06P 1/18; D06P 3/54
[52] U.S. Cl. .................. 260/206; 260/152; 260/156; 260/205; 260/207; 260/207.1; 260/207.5
[58] Field of Search ............ 260/206, 207, 205, 207.1, 260/207.5

[56] References Cited

U.S. PATENT DOCUMENTS

| | | | |
|---|---|---|---|
| 3,516,982 | 6/1970 | Dimroth et al. | 260/206 |
| 3,535,306 | 10/1970 | Altermatt et al. | 260/207.1 |
| 3,663,531 | 5/1972 | Liechti | 260/206 |
| 3,865,805 | 2/1975 | Altermatt | 260/205 |
| 3,883,503 | 5/1975 | Van Assche et al. | 260/206 |
| 3,926,946 | 12/1975 | Ridyard | 260/206 |
| 3,994,873 | 11/1976 | Sommer et al. | 260/206 |

FOREIGN PATENT DOCUMENTS 1047026 11/1966 United Kingdom ............ 260/206

*Primary Examiner*—Floyd D. Higel

*Attorney, Agent, or Firm*—Sprung, Felfe, Horn, Lynch & Kramer

[57] ABSTRACT

Disperse dyestuffs of the formula

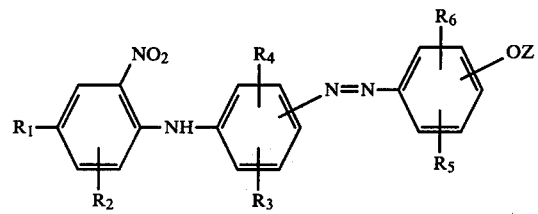

wherein
Z is an alkyl, aralkyl, cycloalkyl, or aryl radical and
$R_1$ represents H, $NO_2$, CN, $CF_3$, halogen, alkyl $SO_2X_1$, $SO_2NX_2X_3$, $SO_2OX_1$, $CONX_2X_3$, SCN, $OX_1$, $SX_1$ or $NX_2X_3$,
$R_2$ represents H, $NO_2$, halogen, alkyl, $OX_1$ or aryl,
$R_3$ and $R_4$ independently of each other represent H, halogen, alkyl, $SO_2X_1$, $SO_2NX_2X_3$, $SO_2OX_1$, $COX_1$, $CONX_2X_3$, $NX_1X_2$, OH, $OX_1$ or aryl,
$R_5$ represents H, halogen, alkyl, $OX_1$ or aryl and
$R_6$ represents H or alkyl and
$X_1$ denote alkyl, aryl or aralkyl and
$X_2$ and $X_3$ denote H, alkyl, cycloalkyl, aryl or aralkyl with the proviso that Z represents aralkyl, aryl or substituted alkyl when $R_1$ denotes $SO_2NX_2X_3$ or $SO_2OX_1$.

The dyestuffs are suitable for dyeing synthetic fibre materials, especially polyesters, which are dyed in yellow to orange-red shades of good tinctorial strength and with good fastness properties in use, such as, for example, fastness to light and wet processing.

11 Claims, No Drawings

MONOAZODYESTUFFS CONTAINING DIPHENAMINE AND PHENOXY COMPONENTS

The invention relates to nitroazo dyestuffs which are free from sulphonic acid groups and of the formula

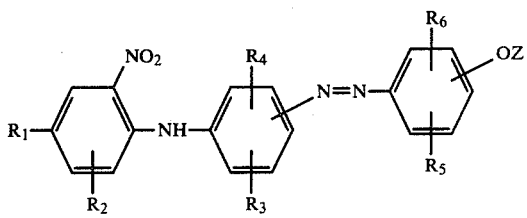

wherein
- Z represents an optionally substituted alkyl, aralkyl, cycloalkyl or aryl radical and
- $R_1$ represents H, $NO_2$, CN, $CF_3$, halogen, alkyl, $SO_2X_1$, $SO_2NX_2X_3$, $SO_2OX_1$, $CONX_2X_3$, SCN, $OX_1$, $SX_1$ or $NX_2X_3$,
- $R_2$ represents H, $NO_2$, halogen, alkyl, $OX_1$ or aryl,
- $R_3$ and $R_4$ independently of one another represent H, halogen, alkyl, $SO_2X_1$, $SO_2NX_2X_3$, $SO_2OX_1$, $COX_1$, $CONX_2X_3$, $NX_1X_2$, OH, $OX_1$ or aryl,
- $R_5$ represents H, halogen, alkyl, $OX_1$ or aryl and
- $R_6$ represents H or alkyl and
- $X_1$ denotes alkyl, aryl or aralkyl and
- $X_2$ and $X_3$ independently of one another denote H, alkyl, cycloalkyl, aryl, aralkyl or the radical of a heterocyclic compound, or conjointly with the N atom, denote a 5 to 7-membered saturated heterocyclic structure, with the proviso that Z represents aralkyl, aryl or substituted alkyl when $R_1$ denotes $SO_2NX_2X_3$ or $SO_2OX_1$.

In the dyestuffs according to the invention the azo group is in the meta-position or para-position relative to the amino group of the diphenylamine and the radical —OZ is in the ortho-position or para-position relative to the azo group.

The abovementioned alkyl, aralkyl, cycloalkyl and aryl radicals and also the heterocyclic radicals can contain further non-ionic substituents.

Examples of suitable radicals Z are $C_1$-$C_4$-alkyl radicals, which can optionally be substituted by halogen, hydroxyl, $C_1$-$C_4$-alkoxy, phenoxy, $C_1$-$C_4$-alkylcarbonyloxy or aryl, as well as radicals of the formula

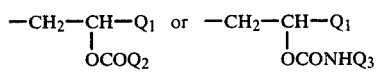

in which
- $Q_1$ represents H, $C_1$-$C_4$-alkyl or aryl and
- $Q_2$ and $Q_3$ represent $C_1$-$C_4$-alkyl, aralkyl or aryl and the aryl radicals are defined as described below.

Within the scope of this invention, suitable alkyl is, in particular, alkyl with 1–4 C atoms which can optionally further be monosubstituted by cyano, halogen, such as chlorine, bromine or fluorine, hydroxyl or $C_1$-$C_4$-alkoxy, for example, methyl, ethyl, n-propyl, iso-propyl, n-butyl, tert.-butyl, cyanoethyl or 2-chloroethyl.

Suitable aryl is, in particular, phenyl which is optionally monosubstituted to trisubstituted by halogen, $C_1$-$C_4$-alkyl and $C_1$-$C_4$-alkoxy.

Suitable alkoxy is, in particular, $C_1$-$C_4$-alkoxy.

Suitable halogen is chlorine, bromine or fluorine, but preferably chlorine.

Suitable aralkyl is, for example, benzyl or phenethyl.

Suitable cycloalkyl is, for example, cyclopentyl, cyclohexyl and cycloheptyl.

A suitable heterocyclic radical is, for example, the 3-sulpholanyl radical or the 2-pyridyl radical.

Suitable radicals of heterocyclic compounds which are formed by $X_2$ plus $X_3$ with the influence of the N atom are piperidinyl, pyrrolidinyl and morpholinyl.

Preferred dyestuffs are those of the formula

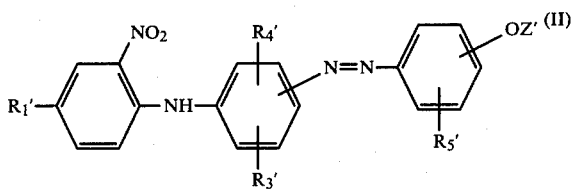

wherein
- $Z'$ represents $C_1$-$C_4$-alkyl, $C_2$-$C_4$-hydroxyalkyl and also radicals of the formula

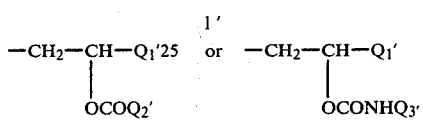

in which
- $Q_1'$ represents H or $C_1$-$C_4$-alkyl and
- $Q_2'$ and $Q_3'$ denote $C_1$-$C_4$-alkyl, phenyl or tolyl,
- $R_1'$ represents H, $NO_2$, CN, $CF_3$, $SO_2X_1'$, $SO_2NX_2'X_3'$, $COX_1'$ or $CONX_1'X_2'$,
- $R_3'$ represents H, chlorine, $C_1$-$C_4$-alkyl, $C_1$-$C_4$-alkoxy or $SO_2NX_1'X_2'$,
- $R_4'$ represents H, chlorine, $C_1$-$C_4$-alkyl or $C_1$-$C_4$-alkoxy and
- $R_5'$ represents H, chlorine, $C_1$-$C_4$-alkyl or phenyl and
- $X_1'$ represents $C_1$-$C_4$-alkyl, phenyl, benzyl or phenethyl and
- $X_2'$ and $X_3'$ independently of one another represent $C_1$-$C_4$-alkyl, phenyl, benzyl or phenethyl.

In the said dyestuffs, the azo group is in the meta-position or para-position relative to the amino group of the diphenylamine and the —OZ' group is in the ortho-position or para-position relative to the amino group.

The said alkyl radicals can optionally be further substituted by chlorine and the said phenyl radicals can optionally be further substituted by chlorine, methyl, ethyl, methoxy or ethoxy.

Dyestuffs of the formula

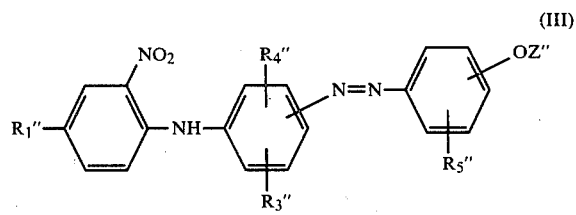

wherein

Z" represents methyl, ethyl, propyl, butyl, hydroxyethyl, hydroxypropyl, hydroxybutyl and chlorohydroxypropyl as well as radicals of the formula

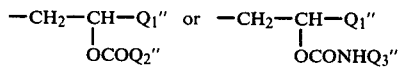

in which
Q$_1$" denotes H, methyl or ethyl and
Q$_2$" and Q$_3$" denote methyl, phenyl or tolyl,
R$_1$" represents H, NO$_2$, CF$_3$, SO$_2$X$_1$', SO$_2$NX$_2$'X$_3$' or SO$_2$OX$_1$',
R$_3$" and R$_4$" independently of one another represent H, halogen, methyl, ethyl, methoxy and ethoxy,
R$_5$" represents H, chlorine, C$_1$-C$_4$-alkyl or phenyl and
X$_1$', X$_2$' and X$_3$' have the abovementioned meaning and the azo group is in the meta-position or para-position relative to the amino group of the diphenylamine and the —OZ" group is in the ortho-position or para-position relative to the azo group,
are very particularly preferred. Amongst these dyestuffs, in turn, those in which R$_1$, R$_1$' and R$_1$" represent hydrogen are preferred.

The dyestuffs can be prepared by various processes. One process consists in diazotising an amine

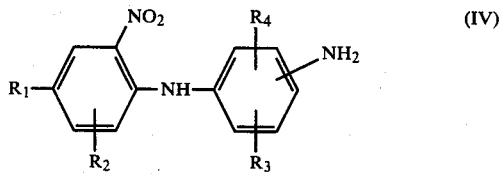

wherein
R$_1$-R$_4$ have the abovementioned meaning,
then coupling the diazo compound with a phenol of the formula

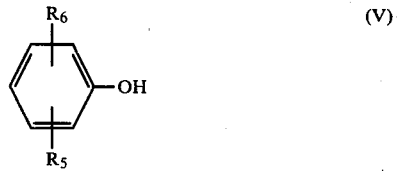

wherein
R$_5$ and R$_6$ have the abovementioned meaning,
and etherifying the phenolic group of the resulting azo compound, for example with alkyl halides, dialkyl sulphates or alkylene oxides.

In the resulting compounds, the aliphatic hydroxyl group formed by the reaction with an aldehyde oxide can optionally be reacted with an alkyl isocycanate or aryl isocyanate or esterified with an alkylcarboxylic acid halide or anhydride or arylcarboxylic acid halide or anhydride.

A further process is characterised in that an o-nitrohalogenobenzene of the formula

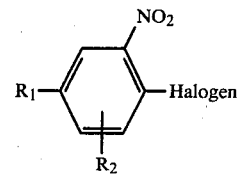

wherein
R$_1$ and R$_2$ have the abovementioned meaning and
Halogen represents iodine, bromine or, preferably, chlorine,
is subjected to a condensation reaction with an aminoazo compound of the formula

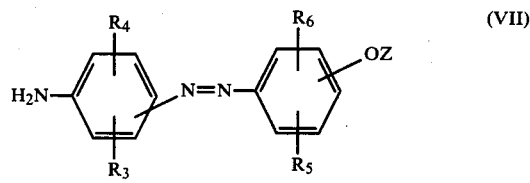

wherein
R$_3$-R$_6$ and Z have the abovementioned meaning,
and, if Z represents hydrogen, the phenolic group in the resulting condensation product is etherified.

The aliphatic hydroxyl group formed by the reaction with an alkylene oxide can then optionally be reacted with an alkyl isocyanate or aryl isocyanate or esterified with an alkylcarboxylic acid halide or anhydride or arylcarboxylic acid halide or anhydride.

Examples of suitable diazo components of the formula (IV) are 2-nitro-4'-aminodiphenylamine, 2-nitro-3'-methoxy-4'-aminodiphenylamine, 2-nitro-2'-methyl-4'-aminodiphenylamine, 2,4-dinitro-2',5'-dimethoxy-4'-aminodiphenylamine, 2,4-dinitro-4'-aminodiphenylamine, 2-nitro-4-dimethylaminosulphonyl-4'-aminodiphenylamine, 2-nitro-4-dibutylaminosulphonyl-3'-methoxy-4'-aminodiphenylamine, 2-nitro-4-methylethylaminosulphonyl-4'-aminodiphenylamine, 2-nitro-4-diphenylaminosulphonyl-2'-ethyl-4'-aminodiphenylamine, 2-nitro-4-benzylmethylaminosulphonyl-4'-aminodiphenylamine, 2-nitro-4-(N-2-phenethyl-N-methyl)-sulphamoyl-3'-methyl-4'-aminodiphenylamine, 2-nitro-4-ethylsulphonyl-4'-aminodiphenylamine, 2,6-dinitro-4-benzylsulphonyl-2',5'-dichloro-4'-aminodiphenylamine, 2-nitro-4-cyano-3'-methyl-sulphonyl-4'-aminodiphenylamine, 2-nitro-4-diethylamino-carbonyl-2',5'-dichloro-4'-aminodiphenylamine, 2-nitro-4-diphenylaminocarbonyl-4'-aminodiphenylamine, 2-nitro-4-morpholin-1-yl-carbonyl-4'-aminodiphenylamine, 2-nitro-4-pyrrolidin-1-yl-carbonyl-3'-methoxy-4'-amino-diphenylamine, 2-nitro-4-methoxycarbonyl-3'-chloro-4'-aminodiphenylamine, 2-nitro-4-carboxy-3'-dimethylamino-sulphonyl-4'-aminodiphenylamine, 2-nitro-4-cyano-4'-aminodiphenylamine, 2-nitro-4-butoxycarbonyl-3'-ethyl-4'-aminodiphenylamine, 2-nitro-4-sulpho-4'-aminodiphenylamine, 2-nitro-4-butoxycarbonyl-3'-ethyl-4'-aminodiphenylamine, 2-nitro-4-di-(2-cyanoethyl)-aminosulphonyl-4'-aminodiphenylamine, 2-nitro-4-morpholin-1-yl-sulphonyl-3'-methoxy-4'-aminodiphenylamine, 2-nitro-4-pyrrolidin-1-yl-sulphonyl-4'-aminodiphenylamine, 2,6-dinitro-3'-N-benzyl-N-methylsulphamoyl-4'-aminodiphenylamine, 2-nitro-4-methyl-(4-chlorophenyl)-amino-sulphonyl-3'-methyl- 4'-aminodiphenylamine, 2-nitro-4-N-cyclohexyl-N-methylsulphamoyl-4'-aminodiphenylamine, 2,4-dinitro-2'-methoxy-4'-amino-5'-methyldiphenylamine, 2,4,6-trinitro-2'-chloro-4'-amino-5'-methoxy-diphenylamine, 2-nitro-4-cyano-4'-aminodiphenylamine, 2-nitro-4-trifluoromethyl-4'-aminodiphenylamine, 2-nitro-4-dimethylaminocarbonyl-3'-methoxy-4'-aminodiphenylamine, 2-nitro-4-benzylcarbonyl-3'-methyl-4'-aminodiphenylamine, 2-nitro-4-phenoxysulphonyl-4'-aminodiphenylamine, 2-nitro-4-butoxysulphonyl-2',5'-dichloro-4'-aminodiphenylamine, 2-nitro-4-benzyloxysulphonyl-4'-aminodiphenylamine, 2-nitro-4-thiocyanato-4'-aminodiphenylamine, 2-nitro-4-methoxy-4'-aminodiphenylamine, 2-nitro-4-phenoxy-3'-methyl-4'-aminodiphenylamine, 2-nitro-4-butylmercapto-4'-aminodiphenylamine, 2-nitro-4-(4-methylphenylmercapto)-4'-aminodiphenylamine, 2-nitro-4-diethylamino-4'-aminodiphenylamine, 2-nitro-4-methyl-3'-methoxy-4'-aminodiphenylamine, 2-nitro-3'-aminodiphenylamine, 2-nitro-3'-amino-4'-methyl-diphenylamine, 2-nitro-3'-amino-4'-methoxy-diphenylamine, 2,4-dinitro-3'-amino-diphenylamine, 2,4-dinitro-3'-amino-4'-methyl-diphenylamine, 2-nitro-4-cyano-3'-amino-diphenylamine, 2-nitro-4-trifluoromethyl-3'-aminodiphenylamine, 2-nitro-4-trifluoromethyl-3'-amino-4'-methoxy-diphenylamine, 2-nitro-4-phenylaminosulphonyl-3'-amino-diphenylamine, 2-nitro-4-methylsulphonyl-3'-amino-4'-chloro-diphenylamine, 2-nitro-4-phenoxysulphonyl-3'-amino-diphenylamine, 2-nitro-4-ethoxysulphonyl-3'-amino-4'-methyl-diphenylamine, 2-nitro-4-methylethylaminocarbonyl-3'-aminodiphenylamine, 2-nitro-4-phenoxycarbonyl-3'-aminodiphenylamine and 2-nitro-4-butoxy-3'-aminodiphenylamine.

Examples of suitable phenolic coupling components (VI) which may be mentioned are: phenol, o-cresol, m-cresol, p-cresol, 1-hydroxy-4-ethylbenzene, 1-hydroxy-4-tert.-butyl-benzene, 1-hydroxy-2-ethyl-benzene, 1-hydroxy-2-isopropyl-benzene, 1-hydroxy-2-sec.-butyl-benzene, 3-hydroxy-1,2-dimethyl-benzene, p-chlorophenol, 2-hydroxy-1,4-dimethyl-benzene, 4-hydroxy-1,2-dimethyl-benzene, 2-hydroxy-1,3-diethyl-benzene, 1-hydroxy-2-methoxy-benzene, 1-hydroxy-3-methoxy-benzene, m-chlorophenol, 4-hydroxy-diphenyl, 3-chloro-2-hydroxy-triphenyl, 1-hydroxy-3-ethoxy-benzene, 1-hydroxy-4-butoxy-benzene, 1-hydroxy-3-butoxy-benzene, 2-hydroxy-diphenyl, o-chlorophenol and 6-chloro-methylphenol.

Suitable alkylating agents for etherifying the phenolic OH groups are: dimethyl sulphate, diethyl sulphate, methyl chloride, methyl iodide, ethyl chloride, ethyl bromide, propyl chloride, isopropyl chloride, butyl chloride, benzyl chloride, p-toluenesulphonic acid methyl ester, benzenesulphonic acid ethyl ester and p-toluenesulphonic acid benzyl ester.

Examples of alkylene oxides which are suitable for the etherification are ethylene oxide, 1,2-propylene oxide, 1,2- and 2,3-butylene oxide, styrene oxide, glycidol, glycidyl methyl ether, glycidyl acetate, glycidyl propionate, glycidyl methylacrylate, glycidyl benzyl ether, epichlorohydrin and isobutylene oxide.

The terminal hydroxyl groups formed during the etherification can, if desired, be reacted in a manner which is in itself known with acylating agents or isocyanates.

Examples of acylating agents and isocyanates suitable for this purpose are: acetic anhydride, acetyl chloride, chloroacetyl chloride, propionic acid anhydride, propionic acid chloride, butyric acid anhydride, butyric acid chloride, isovaleryl chloride, methyl isocyanate, ethyl isocyanate, propyl isocyanate, isopropyl isocyanate, butyl isocyanate, isobutyl isocyanate, tert.-butyl isocyanate, benzoic acid chloride, benzoic acid anhydride, 2-chloro-benzoic acid chloride, 3-chloro-benzoic acid chloride, 4-chloro-benzoic acid chloride, 2,5-dichloro-benzoic acid chloride, 3-nitro-benzoic acid chloride, 4-nitro-benzoic acid chloride, 4-chloro-3-nitro-benzoic acid chloride, 3,5-dinitro-benzoic acid chloride, 3-trifluoromethyl-benzoic acid fluoride, 3-methyl-benzoic acid chloride, 4-methyl-benzoic acid chloride, 3-nitro-4-methyl-benzoic acid chloride, cyclohexyl isocyanate, phenyl isocyanate, 3-chloro-phenyl isocyanate, 4-chloro-phenyl isocyanate, 3,4-dichloro-phenyl isocyanate, 2-nitro-phenyl isocyanate, 2-methyl-phenyl isocyanate, 3-methyl-phenyl isocyanate, 3-trifluoromethyl-phenyl isocyanate, 4-methyl-phenyl isocyanate, 3-chloro-4-methyl-phenyl isocyanate and benzyl isocyanate.

The condensation reaction of the o-nitrohalogenobenzenes (VII) with the aminoazo dyestuffs (VIII) are carried out in a manner which is in itself known, for example in an aqueous medium with the addition of organic solvents, such as alcohols or glycols, in the presence of acid-binding agents, such as alkali metal carbonates, alkali metal bicarbonates, calcium carbonate or magnesium oxide. The condensation reaction can also be carried out under anhydrous conditions, for example in glycol or glycol monomethyl ether, in the presence of sodium acetate or the abovementioned acid-binding agents. Temperatures of between 50° and 200° C. and preferably of between 80° and 150° C. are employed for the condensation reaction.

The diazotisation of the diazo components (V) is effected in a manner which is in itself known, for example in acid aqueous solution or suspensions with sodium nitrite solution and the diazotisation temperatures can be between 0° and 20° but preferably between 10° and 15° C. The diazotisation can, for example, also be carried out in organic solvents, such as methylene chloride, chloroform, trichloroethylene, dimethylformamide or dimethylsulphoxide.

The coupling reaction of the diazotised amines (V) with the phenols of the formula (VI) is also carried out in a customary manner, in an aqueous-alkaline or organic medium. The azo dye compounds which are thus obtained can be isolated by filtering off, if necessary after adding sodium chloride.

The dyestuffs according to the invention are very intense in colour and are suitable for dyeing synthetic fibre materials, especially polyamides, such as, for example, polycaprolactam, polyhexamethylenediamine adipate or polyaminoundecanoic acid, but very particularly polyesters, such as polyethylene terephthalate and poly-1,4-cyclohexanedimethylene terephthalate, from aqueous liquors or organic solvents. The said types of fibre are dyed in yellow to orange-red shades of good tinctorial strength and with good fastness properties in use, such as fastness to light, sublimation and wet processing.

EXAMPLE 1

229 g of 2-nitro-4'-amino-diphenylamine are suspended in 1.2 l of water and 200 ml of concentrated hydrochloric acid and 700 ml of a 10% strength sodium nitrite solution are added at 5°–10° C. The mixture is stirred for a further 1.5 hours at 5°–10° C. and the excess nitrite is then destroyed with amidosulphonic acid. This diazonium salt suspension is allowed to run into 110 g of p-cresol, dissolved in 400 ml of water, at 0°–5° C. and pH 10 and the pH value is kept at 10 by adding sodium hydroxide solution until the coupling reaction has ended. The resulting dyestuff of the formula

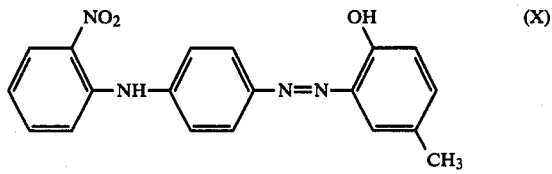
(X)

is filtered off, washed with water and dried at 80° C.

EXAMPLE 2

10 g of the dyestuff of the formula (X) are dissolved, at 80°–90° C., in 100 ml of glycol monomethyl ether with the addition of 30 ml of 20% strength sodium hydroxide solution. 10 g of dimethyl sulphate are added dropwise at this temperature and the mixture is stirred for a further 2 hours. It is allowed to cool and the dyestuff which has precipitated is filtered off, rinsed with alcohol and dried at 80° C. in vacuo. The resulting dyestuff corresponds to the formula

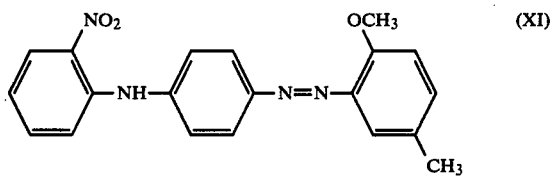
(XI)

It dyes synthetic polyesters and polyamides reddish-tinged yellow with good fastness properties, by the indicated processes.

EXAMPLE 3

20 g of the dyestuff of the formula (X) are dissolved, at 80°–90° C., in 100 ml of glycol monomethyl ether with the addition of 3 g of sodium carbonate. 10 g of 1,2-butylene oxide are added dropwise at this temperature and the mixture is stirred for a further 6 hours. It is cooled and the resulting precipitate of the formula

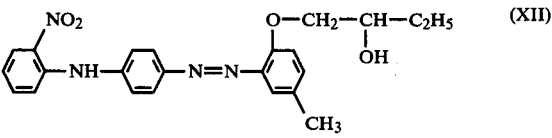
(XII)

is filtered off, rinsed with methanol and dried at 60° C. in vacuo. The resulting dyestuff dyes synthetic polyamides and polyesters in reddish-tinged yellow shades with good fastness properties, by the indicated processes.

EXAMPLE 4

10 g of the dyestuff of the formula (XII) are dissolved in 150 ml of dry pyridine at 80° C. 20 g of acetic anhydride are added dropwise at this temperature and the mixture is stirred for a further 4 hours. 500 ml of water are then added to the solution. The precipitate which is thus obtained is filtered off after the mixture has cooled, rinsed with methanol and dried in vacuo at 60° C. The dyestuff corresponds to the formula

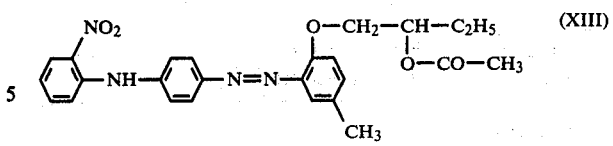
(XIII)

and dyes synthetic polyesters and polyamides in reddish-tinged yellow shades with good fastness properties, and especially good fastness to sublimation, by the indicated processes.

EXAMPLE 5

10 g of the dyestuff of the formula (XII) are dissolved in 150 ml of dry chlorobenzene at 40° C. 0.2 g of tin octoate is added at this temperature and 6 g of phenyl isocyanate are then added dropwise. The mixture is stirred for a further 2 hours at 60° C. and allowed to cool and the precipitate of the formula

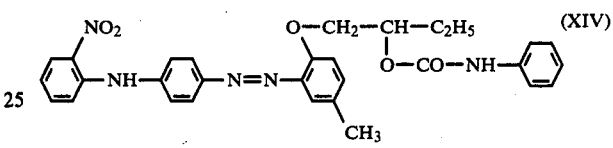
(XIV)

is filtered off, rinsed with methanol and dried at 60° C. in vacuo. The dyestuff dyes synthetic dyes synthetic polyesters and polyamides with good fastness properties by the indicated processes.

DYEING EXAMPLES 1. 1 part of the dyestuff which has been obtained according to Example 4 and finely dispersed according to customary processes is stirred into 2,000 parts of water. The pH value is adjusted to 5 to 6 with acetic acid and 4 parts of ammonium sulphate and 2 parts of a commercially available dispersing agent based on a naphthalenesulphonic acid/formaldehyde condensate are added. 100 parts of a polyester fabric based on polyethylene glycol terephthalate are introduced into the dye liquor which is thus obtained and dyeing is carried out for 1½ hours at 120°–130° C. After subsequent rinsing, reductive after-treatment with a 0.2% strength alkaline solution of sodium dithionite for 15 minuts at 60° C., rinsing and drying, a reddish-tinged yellow dyeing with good fastness properties, and in particular good fastness to light and sublimation, is obtained.

2. 100 parts of a fabric made of polyethylene terephthalate fibres are introduced at room temperature into a dye bath which has been prepared from 1 part of the monoazo dyestuff of Example 4 and 1,000 parts of tetrachloroethylene. The bath is heated to 110° C. in the course of 20 minutes, with vigorous circulation of the liquor, and is kept at this temperature for 45 minutes. The liquor is then separated off and the fabric is rinsed with fresh tetrachloroethylene at 40° C. After separating off the rinsing liquor, the dyed goods are freed from adhering solvent by centrifuging and drying in a stream of air. A deep reddish-tinged yellow dyeing with good general fastness properties is obtained.

3. 0.1 g of the dyestuff according to Example 4, which has been dispersed well, is introduced at 40° C. into 1 liter of water which also contains 0.2 g of sodium dinaphthylmethanesulphonate and 0.3 g of cresotic acid methyl ester. 10 g of a fabric made of polyethylene terephthalate are introduced into this bath, the temperature of the dye bath is raised to 100° C. in the course of about 20 minutes and dyeing is carried out at this temperature for 60-90 minutes. A deep reddish-tinged yellow dyeing with good fastness to sublimation and light is obtained.

Similar dyestuffs, which have properties similar to those of the dyestuffs obtained according to Example 1 to 5, are obtained when the following diphenylamine diazo component is diazotised and coupled with the following coupling components and the phenolic hydroxyl group is then etherified, by the indicated processes, with the indicated hydrocarbon radicals (introduction of the radical Z). The dyestuffs dye synthetic fibre materials, such as polyesters and polyamides, in reddish-tinged yellow shades with good fastness properties, for example good fastness to light and wet processing.

| Example | Diazo component of the 2-nitro-4'-amino-diphenylamine series | Coupling component | Radical Z |
|---|---|---|---|
| 6 | 4-Nitro | m-cresol | $CH_3$ |
| 7 | 4-Dimethylaminosulphonyl | p-tert.-Butylphenol | $CH_2-CH(OH)-CH_3$ |
| 8 | 4-Dibutylaminosulphonyl-3'-ethoxy | Phenol | $CH_2-CH(OCOCH_3)-C_2H_5$ |
| 9 | 4-Nitro-5-chloro | p-Chlorophenol | $CH_2-CH(OH)-CH_2-Cl$ |
| 10 | 4-Diphenylaminosulphonyl-2-ethyl | o-sec.-Butylphenol | $CH_2-CH(OCONH-C_6H_4-CH_3)-CH_3$ |
| 11 | 4-Benzylmethylaminosulphonyl | o-Cresol | $CH_2-CH(OH)-CH_2-OH$ |
| 12 | 4-(N-2-Phenethyl-N-methyl)-aminosulphonyl-3'-methyl | m-Ethoxyphenol | $CH_2-C(OH)(CH_3)_2$ |
| 13 | 4-Ethylsulphonyl | p-Cresol | $C_2H_5$ |
| 14 | 4-Benzylsulphonyl | m-Cresol | $CH_2-CH_2-OCO-C_6H_5$ |
| 15 | 4-Cyano-2'-methylsulphonyl | Phenol | $CH_3$ |
| 16 | 4-Diphenylaminocarbonyl | Phenol | $CH_2CH_2-OH$ |
| 17 | 4-Diethylaminocarbonyl-2'-5'-dichloro | p-Ethylphenol | $CH_2-CH(OCOC_2H_5)-CH_3$ |
| 18 | 4-N-Morpholin-1-yl-carbonyl | o-Chlorophenol | $CH(CH_3)-CH(OH)-CH_3$ |
| 19 | 4-N-Pyrrolidin-1-yl-carbonyl-3'-methoxy | o-Phenylphenol | $C_4H_9$ |
| 20 | 4-Methoxycarbonyl-3'-chloro | Phenol | $CH_2-CH(OCONHCH_3)-C_2H_5$ |
| 21 | 4-Ethoxy-3'-dimethylaminosulphonyl | m-Cresol | $CH_3$ |
| 22 | 4-Butoxycarbonyl-3'-ethyl | o-Isopropylphenol | $CH_2-CH(OH)-CH_2-O-C_6H_5$ |
| 23 | 4-Di-(2-cyanoethyl)-aminosulphonyl | Phenol | $CH_2CH_2OCO-C_6H_4-Cl$ |
| 24 | 4-N-Morpholin-1-yl-sulphonyl-3'-methoxy | m-Cresol | $CH_2-CH(OH)-C_6H_5$ |
| 25 | 6-Nitro-3'-benzylmethylaminosulphonyl | Phenol | $CH_2CH(OH)-CH_3$ |
| 26 | 4-p-Chlorophenylmethylaminosulphonyl-3'-methyl | o-Ethylphenol | $CH_2-CH(OCONH-C_6H_5)-C_2H_5$ |
| 27 | 4-N-Cyclohexyl-N-methylaminosulphonyl | o-Cresol | $CH_2-CH(OCOCH_3)-CH_2O-C_6H_5$ |
| 28 | 4-Nitro-2'-methoxy-5'-methyl | m-Cresol | $C_3H_7$ |

-continued

| Example | Diazo component of the 2-nitro-4'-amino-diphenylamine series | Coupling component | Radical Z |
|---|---|---|---|
| 29 | 4,6-Dinitro-2'-chloro-5'-methoxy | p-Cresol | $CH_2CH-CH_3$<br>$\quad\quad\;\;\, |$<br>$\quad\quad\;\;\, OH$ |
| 30 | 4-Dimethylaminosulphonyl | o-Phenylphenol | $CH_2-CH_2-OCONH-C_3H_7$ |
| 31 | 4-Benzylmethylaminosulphonyl | Phenol | $CH_2-CH\!\!\begin{array}{c}\diagup CH_3 \\ \diagdown CH_3\end{array}$<br>$\quad\quad\;\; |$<br>$\quad\quad\;\; OH$ |
| 32 | 4-Diphenylaminosulphonyl | p-tert.-Butylphenol | $CH_2CH_2-OH$ |
| 33 | 4-N-Butyl-N-ethylaminosulphonyl | m-Ethylenephenol | $CH_2-CH-C_2H_5$<br>$\quad\quad\;\; |$<br>$\quad\quad\;\; OCO-\!\!\bigcirc\!\!-CH_3$ |
| 34 | 4-Nitro | p-Phenylphenol | $CH_3$ |
| 35 | 4-(N-2-Phenethyl-N-ethyl)-aminosulphonyl | Phenol | $CH_2CH-CH_3$<br>$\quad\quad\;\;\, |$<br>$\quad\quad\;\;\, OH$ |
| 36 | 4-(N-3'-Sulpholanyl)-sulphamoyl | p-Cresol | $CH_2CH_2-O-CO-NH-\!\!\bigcirc\!\!-H$ |
| 37 | 4-Phenoxysulphonyl | Phenol | $CH_3$ |
| 38 | 4-Ethoxysulphonyl | m-Cresol | $C_2H_5$ |
| 39 | 4-Phenoxysulphonyl | m-Cresol | $CH_2CH-CH_2Cl$<br>$\quad\quad\;\;\, |$<br>$\quad\quad\;\;\, OH$ |
| 40 | 4-Benzyloxysulphonyl | Phenol | $CH_2-CH-C_2H_5$<br>$\quad\quad\;\; |$<br>$\quad\quad\;\; OCO-\!\!\bigcirc\!\!-CF_3$ |
| 41 | 4-Phenoxycarbonyl | Phenol | $CH_2-CH-C_2H_5$<br>$\quad\quad\;\; |$<br>$\quad\quad\;\; O-CO-NH-CH\!\!\begin{array}{c}\diagup CH_3 \\ \diagdown CH_3\end{array}$ |
| 42 | 4-Cyano | m-Chlorophenol | $CH_3$ |
| 43 | 4-Trifluoropmethyl | 4-Hydroxy-diphenyl | $C_2H_5$ |
| 44 | 4-Dimethylaminocarbonyl-3'-methoxy | 3-Chloro-2-hydroxy-diphenyl | $CH_2CH_2-OH$ |
| 45 | 4-Benzylcarbonyl-3'-methyl | Phenol | $CH_2-CH-CH_3$<br>$\quad\quad\;\; |$<br>$\quad\quad\;\; OCONHCH_2-\!\!\bigcirc$ |
| 46 | 4-Thiocyanato | o-Cresol | $C_3H_7$ |
| 47 | 4-Methoxy | o-Chlorophenol | $CH_2-CH_2-OCOCH_3$ |
| 48 | 4-Phenoxy-3'-methyl | 1-Hydroxy-4-ethyl-benzene | $CH_2-CH-CH_3$<br>$\quad\quad\;\; |$<br>$\quad\quad\;\; OCONH-\!\!\bigcirc\!\!\begin{array}{c}-Cl \\ -Cl\end{array}$ |
| 49 | 4-Butylmercapto | p-Cresol | $CH_2-CH-CH_2-O-CH_3$<br>$\quad\quad\;\;\;\, |$<br>$\quad\quad\;\;\;\, OH$ |
| 50 | 4-(p-Toluenemercapto) | 4-Hydroxy-diphenyl | $CH_3$ |
| 51 | 4-Diethylamino | m-Cresol | $CH_2-CH-C_2H_5$<br>$\quad\quad\;\; |$<br>$\quad\quad\;\; OH$ |
| 52 | 4-Methyl-3'-methoxy | Phenol | $C_4H_9$ |
| 53 | 3'-Methoxy | m-Cresol | $CH_2CH_2-OH$ |
| 54 | 2'-Methyl | p-Cresol | $CH_2-CH-CH_3$<br>$\quad\quad\;\; |$<br>$\quad\quad\;\; OCOCH_3$ |
| 55 | 4-Nitro-2',5'-dimethoxy | 2,6-diethylphenol | $CH_3$ |
| 56 | 4-Trifluoromethyl-3'-methyl | o-Cresol | $CH_2CH-C_2H_5$<br>$\quad\quad\;\;\, |$<br>$\quad\quad\;\;\, OH$ |
| 57 | 4-Trifluoromethyl- | Phenol | $CH_2CH_2OCOCH_3$ |
| 58 | 4-Trifluoromethyl | p-Chlorophenol | $CH_2-CH-CH_3$<br>$\quad\quad\;\; |$<br>$\quad\quad\;\; OCO-NH-\!\!\bigcirc\!\!-CH_3$ |
| 59 | | p-Cresol | $C_2H_5$ |
| 60 | -4'-methyl | o-Chlorophenol | $CH_2CH-CH_3$<br>$\quad\quad\;\;\, |$<br>$\quad\quad\;\;\, OH$ |

-continued

| Example | Diazo component of the 2-nitro-4'-amino-diphenylamine series | Coupling component | Radical Z |
|---|---|---|---|
| 61 | -4'-methoxy | 4-Hydroxy-diphenyl | CH$_2$—CH—C$_2$H$_5$<br>   \|<br>   OCOCH$_3$ |
| 62 | 4-Nitro | m-Cresol | CH$_2$CH—CH$_3$<br>   \|<br>   OCONHC$_2$H$_5$ |
| 63 | 4-Nitro-4'-methyl | p-Chlorophenol | CH$_3$ |
| 64 | 4-Cyano | Phenol | CH$_2$CH$_2$OH |
| 65 | 4-Trifluoromethyl | o-Cresol | 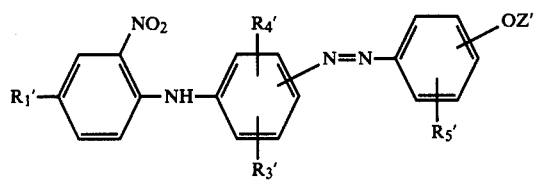 |
| 66 | 4-Trifluoromethyl-4'-methoxy | 1-Hydroxy-4-ethyl-benzene | C$_2$H$_5$ |
| 67 | 4-Phenylaminosulphonyl | p-Cresol | CH$_2$CH—CH$_3$<br>   \|<br>   OH |
| 68 | 4-Methylsulphonyl-4'-chloro | m-Chlorophenol | CH$_3$ |
| 69 | 4-Phenoxysulphonyl | Phenol | CH$_2$CH—C$_2$H$_5$<br>   \|<br>   OH |
| 70 | 4-Ethoxysulphonyl-4'-methyl | 4-Hydroxy-1,2-dimethyl-benzene | CH$_2$CH—CH$_2$—Cl<br>   \|<br>   OCO—C$_4$H$_9$ |
| 71 | 4-Methylethylaminocarbonyl | o-Cresol | 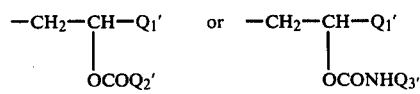 |
| 72 | 4-Phenoxycarbonyl | p-Cresol | C$_3$H$_7$ |
| 73 | 4-Butoxy | 3-Hydroxy-1,2-dimethyl-benzene | 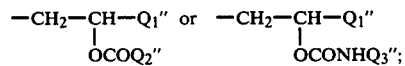 |

We claim:

1. Azo dyestuff having the formula

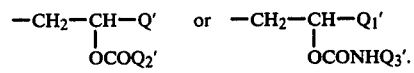

wherein

Z' is C$_1$–C$_4$-alkyl; C$_1$–C$_4$-hydroxyalkyl;

$$-CH_2-CH-Q_1' \quad \text{or} \quad -CH_2-CH-Q_1'$$
$$\phantom{-CH_2-CH}|\phantom{Q_1'} \phantom{\text{or} \quad -CH_2-CH}|$$
$$\phantom{-CH_2-CH}OCOQ_2' \phantom{\text{or} -CH_2-CH}OCONHQ_3'$$

in which

Q$_1$' is H or C$_1$–C$_4$-alkyl; and
Q$_2$' and Q$_3$' are C$_1$–C$_4$-alkyl, phenyl or tolyl;
R$_1$' is H, CN, CF$_3$, COX$_1$' or CONX$_1$'X$_2$';
R$_3$' is H, chlorine, C$_1$–C$_4$-alkyl, C$_1$–C$_4$-alkoxy or SO$_2$NX$_1$'X$_2$';
R$_4$' is H, chlorine, C$_1$–C$_4$-alkyl or C$_1$–C$_4$-alkoxy;
R$_5$' is H, chlorine, C$_1$–C$_4$-alkyl or phenyl;
X$_1$' is C$_1$–C$_4$-alkyl, phenyl, benzyl or phenethyl; and
X$_2$' and X$_3$' independently of one another represent C$_1$–C$_4$-alkyl, phenyl, benzyl or phenethyl.

2. Azo dyestuff of claim 1
wherein
Z' is C$_1$–C$_4$-hydroxyalkyl, $$-CH_2-CH-Q' \quad \text{or} \quad -CH_2-CH-Q_1'$$
$$\phantom{-CH_2-CH}|\phantom{Q'} \phantom{\text{or} \quad -CH_2-CH}|$$
$$\phantom{-CH_2-CH}OCOQ_2' \phantom{\text{or} -CH_2-CH}OCONHQ_3'.$$

3. Azo dyestuff of claim 2
wherein
R$_1$' is H, CN, CF$_3$, COX$_1$' or CONX$_1$'X$_2$'.

4. Azo dyestuff of claim 1
wherein
R$_1$' is H, CN, CF$_3$, COX$_1$' or CONX$_1$'X$_2$'.

5. Azo dyestuff having the formula

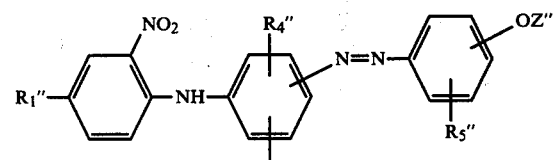

wherein

Z'' is methyl, ethyl, propyl, butyl, hydroxyethyl, hydroxypropyl, hydroxybutyl, chlorohydroxypropyl $$-CH_2-CH-Q_1'' \quad \text{or} \quad -CH_2-CH-Q_1''$$
$$\phantom{-CH_2-CH}|\phantom{Q_1''} \phantom{\text{or} \quad -CH_2-CH}|$$
$$\phantom{-CH_2-CH}OCOQ_2'' \phantom{\text{or} -CH_2-CH}OCONHQ_3'';$$

in which

Q$_1$'' is H, methyl or ethyl;
Q$_2$'' and Q$_3$'' are methyl, phenyl or tolyl;
R$_1$'' is H, or CF$_3$;
R$_3$'' and R$_4$'' independently of one another are H, halogen methyl, ethyl, methoxy or ethoxy;
R$_5$'' is H, chlorine, C$_1$–C$_4$-alkyl or phenyl;

$X_1'$ is $C_1$–$C_4$-alkyl, phenyl, benzyl or phenethyl; and
$X_2'$ is $C_1$–$C_4$-alkyl, phenyl, benzyl and phenethyl; and
$X_3'$ is $C_1$–$C_4$-alkyl, phenyl, benzyl or phenethyl.

6. Azo dyestuff of claim 5 wherein
   $Z''$ is hydroxyethyl, hydroxypropyl, hydroxybutyl, chlorohydroxypropyl,

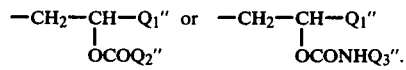

7. Azo dyestuff of claim 6 wherein
   $R_1''$ is H, or $CF_3$.
8. Azo dyestuff of claim 5 wherein
   $R_1''$ is H, or $CF_3$.
9. Azo dyestuff according to claim 1, of the formula

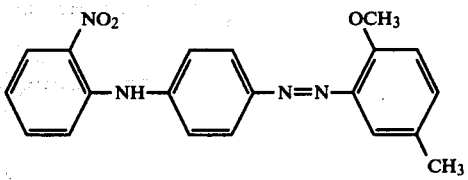

10. Azo dyestuff according to claim 1, of the formula

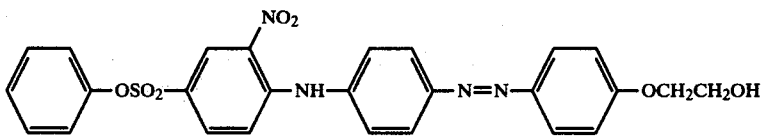

11. Azo dyestuff according to claim 1, of the formula

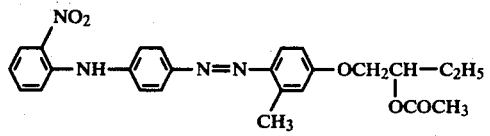

* * * * *